Nov. 29, 1955     G. V. W. ROTH ET AL     2,725,207
FLEXIBLE HOSE SUPPORTS
Original Filed Feb. 28, 1949
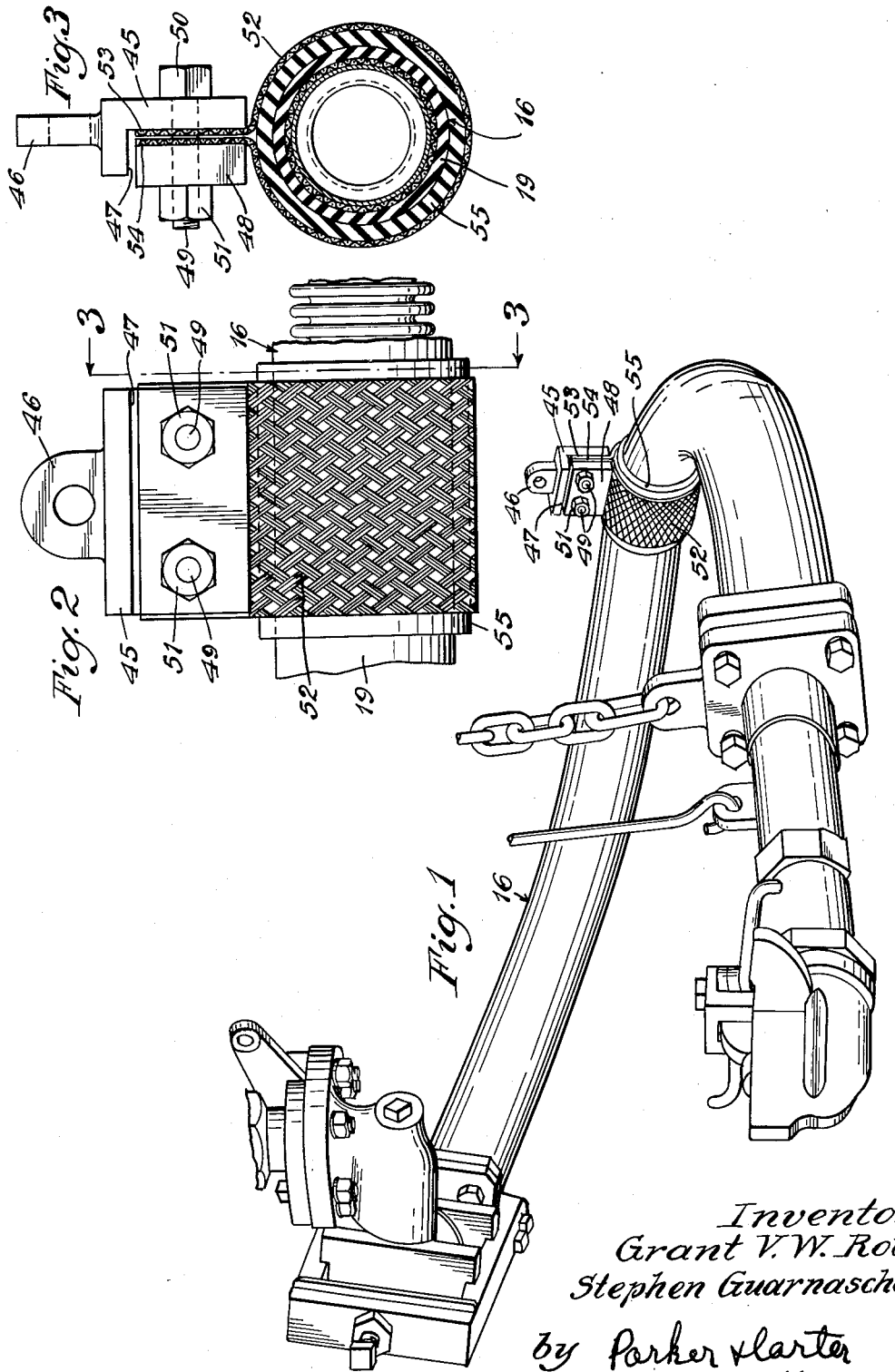
Inventors
Grant V. W. Roth
Stephen Guarnaschelli
by Parker & Carter
Attorneys

United States Patent Office 2,725,207
Patented Nov. 29, 1955

2,725,207

FLEXIBLE HOSE SUPPORTS

Grant V. W. Roth, Evanston, Ill., and Stephen Guarnaschelli, Bethany, Conn., assignors to said Roth, a trustee under The Naugatuck Trust Original application February 28, 1949, Serial No. 78,872. Divided and this application July 26, 1952, Serial No. 301,052

1 Claim. (Cl. 248—62)

Our invention relates to securing or supporting means for tubing, such as flexible tubing providing steam connections between railway cars.

One purpose is to provide an improved securing or supporting means for supporting a flexible connection between railway cars.

Another purpose is to provide flexible supporting means which will stand rough usage and long wear.

Another purpose is to provide a supporting means for expandable tubing which will become fixed in relation to the tubing as the tubing expands.

Other purposes will appear from time to time in the course of the specification and claim.

We illustrate the invention more or less diagrammatically in the accompanying drawings wherein:

Figure 1 is a perspective view of a steam connection;
Figure 2 is a side elevation of our invention; and
Figure 3 is a section on the line 3—3 of Figure 2.

Like parts are indicated by like symbols throughout the specification and drawings.

This application is a division of our co-pending application No. 78,872, filed February 28, 1949, for "Flexible Connections," now Patent No. 2,698,760, January 4, 1955.

Referring to the drawings, we illustrate our invention, as an example, in relation to its use with a flexible steam connection between railway cars, as shown in Figure 1. 16 indicates a flexible tube adapted for connection at its ends to steam connections on railway cars. The tube 16 may be intermediately supported by the supporting means illustrated in detail in Figures 2 and 3. A supporting body 45 is provided with a supporting eye 46. It is recessed, as at 47, to receive a securing block 48. The two blocks are connected, and may be drawn toward each other, by any suitable bolts 49, headed as at 50, and having threaded portions which receive nuts 51. 52 illustrates a tube surrounding member of flexible material, such as metal mesh, which has ends 53 and 54 which extend between the members 45 and 48, and which may be apertured to permit the passage of the bolts 49.

Surrounding the exterior tube layer 19 is a hanger sleeve 55 of rubber or a suitable rubber substitute, which is preferably flexible and readily distortable. In the application of the support it will be understood that the inner surface of the liner 55 conforms generally to the exterior surface of the outer layer 19 of the hose or tube, but that the fit is sufficiently snug frictionally to prevent unintended sliding or slippage of the support in relation to the tube 19.

It will be understood that when the interior of the pipe is subjected to pressure there is some degree of outward expansion of the pipe. When the pipe does expand, the hose layer 19 and the hanger or supporting sleeve 55, being both of material having the characteristics of rubber, do not bind the hose or prevent a reasonable degree of expansion. The outer sleeve 55 embeds itself in and flows upwardly into the mesh 52, both permitting expansion of the hose and firmly holding the support against relative endwise movement in relation to the hose. When the pressure is released or reduced, and there is a slight decrease in outer diameter of the pipe, the fit is still snug enough to prevent unintended relative longitudinal movement of the support and the hose.

It will be realized that, whereas, we have described and illustrated a practical and operative device, nevertheless many changes may be made in the size, shape, number and disposition of parts without departing from the spirit of our invention. We therefore wish our description and drawings to be taken as in a broad sense illustrative or diagrammatic, rather than as limiting us to our precise showing.

The use and operation of the invention are as follows:

We illustrate in Figures 1, 2 and 3 a highly efficient method of our structure for supporting flexible hoses. The hanger liner 55, of a rubber-like substance, snugly fits the exterior of the hose layer 19, even when the hose is not distended by internal pressure. Any increase in internal pressure sufficient to expand the exterior of the hose merely causes the metal mesh to become somewhat imbedded in the expanding hanger liner 55. Thus, we not merely prevent unintended slippage but provide a support which does not cramp or damage the tube when the tube or hose is expanded by internal pressure.

We claim:

For use with flexible tubing having an exterior layer of rubber-like material and subject to periodic expansion, a support for said tubing including a metal band formed of interlaced metal strands, said strands being spaced apart to form a generally open mesh, a sleeve formed of rubber-like material and surrounding said tubing at a point intermediate the ends thereof, the inner surface of said sleeve being in contact with the entire circumferential exterior surface of said tubing at said intermediate point, said metal band being formed in a loop surrounding and in contact with substantially the entire circumferential surface of said sleeve, and a supporting element within which the ends of said band are clamped together to clamp said band securely around and against the circumferential exterior surface of said sleeve, the strands of said mesh being spaced apart sufficiently to permit said exterior sleeve surface, in the event of expansion of the diameter of the tube and sleeve, to enter the spaces between said strands, said strands thereby becoming embedded in the surface of said rubber-like exterior sleeve surface.

References Cited in the file of this patent

UNITED STATES PATENTS

| Number | Name | Date |
|---|---|---|
| 312,755 | Patterson | Feb. 24, 1885 |
| 840,337 | Johnson | Jan. 1, 1907 |
| 1,703,856 | McKeag | Feb. 26, 1929 |
| 1,756,038 | Shwayder | Apr. 29, 1930 |
| 2,054,825 | Talbot | Nov. 3, 1936 |
| 2,319,832 | Trochim | May 25, 1943 |
| 2,354,404 | Sayles | July 25, 1944 |
| 2,417,245 | Eggert | Mar. 11, 1947 |